R. FROMMER & A. MOLNÁR.
METHOD FOR THE MANUFACTURE OF SPRING CAPS.
APPLICATION FILED JAN. 18, 1911.
1,050,121. Patented Jan. 14, 1913.
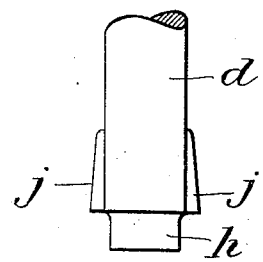

UNITED STATES PATENT OFFICE.

RUDOLF FROMMER AND ANTAL MOLNÁR, OF BUDAPEST, AUSTRIA-HUNGARY; SAID MOLNÁR ASSIGNOR TO FEGYVER-ÉS GÉPGYÁR RÉSZVÉNYTÁRSASÁG, OF BUDAPEST, AUSTRIA-HUNGARY.

METHOD FOR THE MANUFACTURE OF SPRING-CAPS.

1,050,121.     Specification of Letters Patent.     Patented Jan. 14, 1913.

Application filed January 18, 1911. Serial No. 603,367.

*To all whom it may concern:*

Be it known that we, RUDOLF FROMMER and ANTAL MOLNÁR, both of 158 Külsö Soroksári ut, Budapest, Austria-Hungary, subjects of the King of Hungary, residing at Budapest, in the Kingdom of Hungary, are the inventors of certain new and useful Improvements in Methods for the Manufacturing of Spring-Caps, of which the following is a specification.

The spring construction as described in Patent No. 949,466 finds extensive use—among others—also in the manufacturing of weapons. As it is well known single parts of weapons must be manufactured so precisely that they should be fit to be changed immediately without any previous adjusting. For this reason the caps of the spring-construction, which on account of their strong use must be of steel, had to be made hitherto by way of turning and milling and then were to be revised by gages, which—in case of manufacture in masses—raises considerably the costs of production.

The purpose of the present invention is now to reduce the costs of production of these springcaps, which is attained in the sense of the invention in that way that the noses, which serve for the introduction and fixing of the caps in their supports, are manufactured from a whole flange by cutting off the superfluous halfmoon-shaped parts. The cutting off of these parts is executed in the sense of the invention by a punchlike tool, so that this operation consists of a single pressure only which enables an extremely quick working.

The drawing represents the workpiece and the tool required for its manufacture in one form of execution.

Figures 1 and 2 show the halfready workpiece in side-view and in plan, Fig. 3 shows the ready springcap in plan, the parts of the flange which are cut off being represented by dotted lines. Figs. 4 and 5 show the punch in front and under views, while Fig. 6 represents the matrix, of the caliber.

The workpiece $a$ represented in Figs. 1 and 2 with a whole flange $b$ is suitably manufactured by turning on an automatic or revolver lathe. But it is also possible to manufacture the caps with whole flanges—instead of turning—from metal—disks by drawing and pressing. The workpiece with a whole flange is inserted with its cylindrical part $a$ in the matrix $c$ (Fig. 6) so that the flange $b$ lies upon the latter. Now the punch $d$, which is guided exactly concentric to the matrix, is pressed upon the workpiece by means of a press or the like, whereby the two halfmoon-shaped parts $e$, $f$ of the flange $b$ are cut off, so that there remain from the flange the two noses $g$ only, after which the springcap is ready and finished; the latter is at the pressing down of the punch $d$, pressed through the matrix $c$ and can be taken out from beneath the same. The punch stamp $d$ is provided on its underside with a short bolt $h$, which fits exactly in the cylindrical bore $i$ of the springcap. The two studs $j$ of the punch are corresponding with the noses $g$, which are pushed through the grooves $k$ of the matrix.

By the fact that each workpiece is at the pressing-operation pushed through the matrix, all springcaps must be exactly similar to each other so that a further gaging is unnecessary. The springcaps, being pressed through the matrix, which represents also a caliber, are at the same time gaged, that is to say they are finished to the reliably gage-like measure.

Claim:

The herein described method of manufacturing cylindrical caps with projecting lugs on the cylindrical wall, which consists in manufacturing a workpiece with a whole flange containing the lugs and in shearing off portions of the flange by forcing the workpiece through a die and in leaving stand portions of the flange forming the lugs.

In testimony whereof we affix our signatures in presence of two witnesses.

RUDOLF FROMMER.
        ANTAL MOLNÁR.

Witnesses:
  RÜLÖF SCHÖN,
  HUGH KEMING.